May 16, 1933.                L. L. CUSTER                1,909,573
                          AMUSEMENT APPARATUS
                    Filed June 25, 1928        8 Sheets-Sheet 1
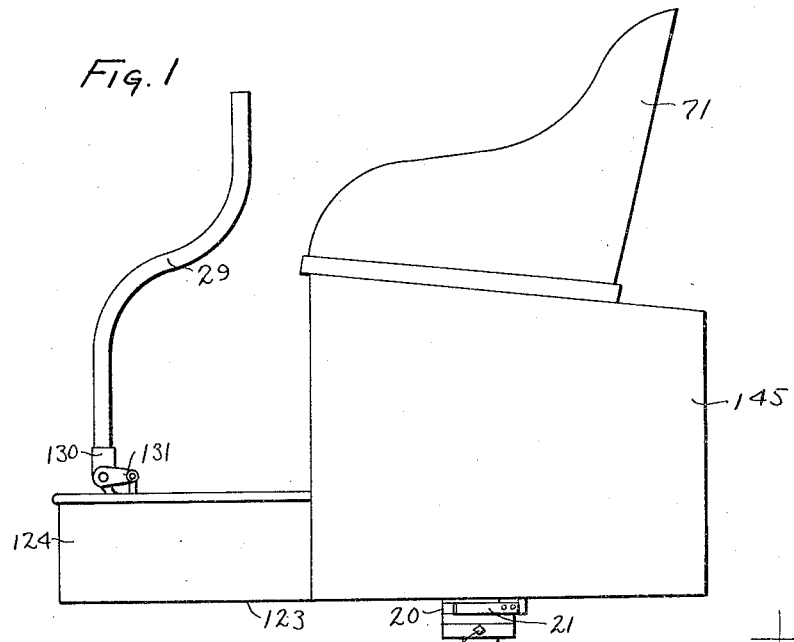
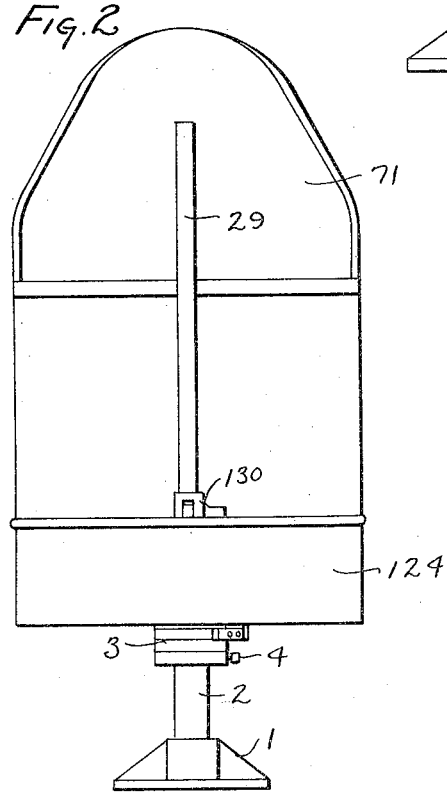
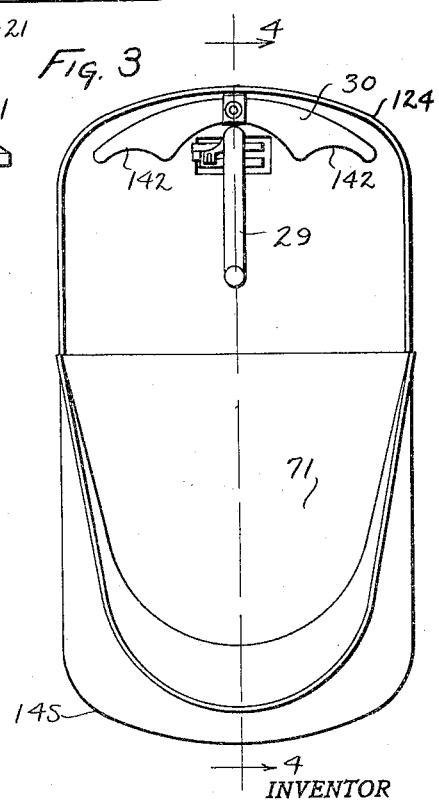

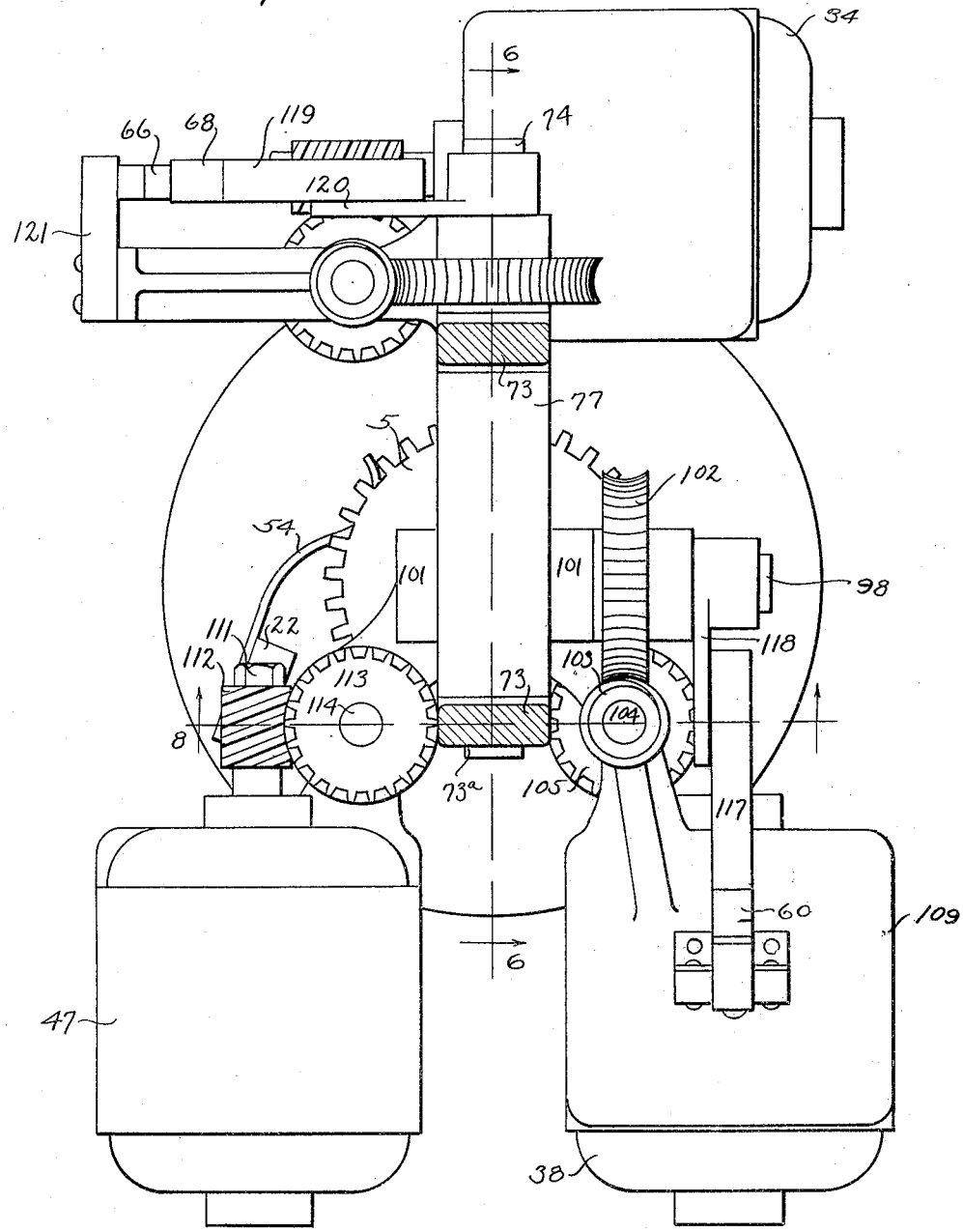

May 16, 1933.  L. L. CUSTER  1,909,573
AMUSEMENT APPARATUS
Filed June 25, 1928  8 Sheets-Sheet 4
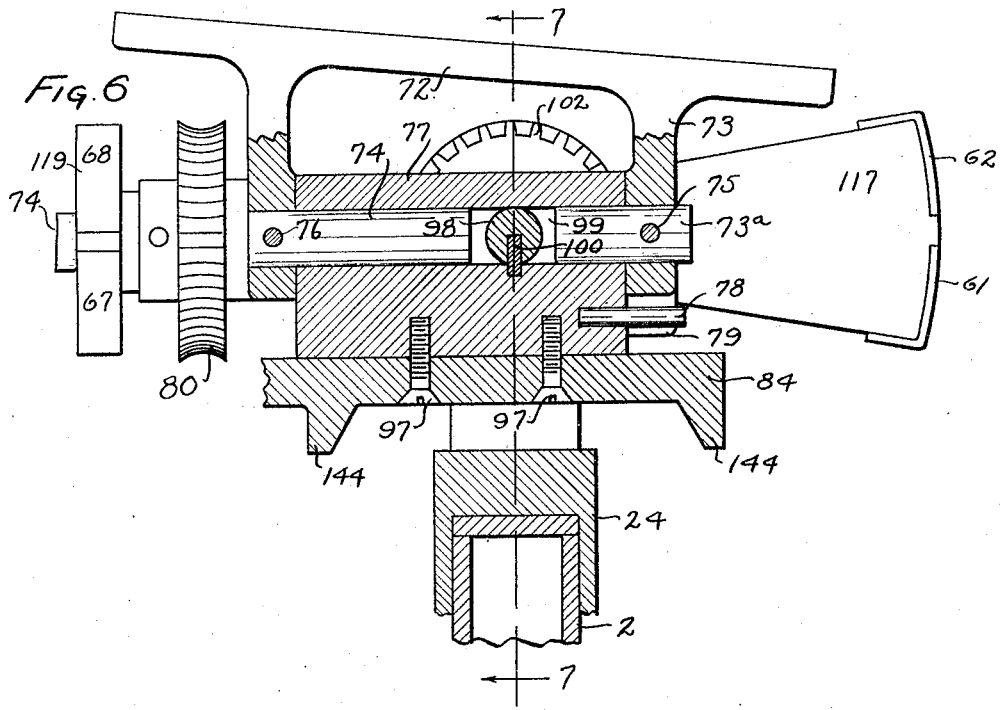
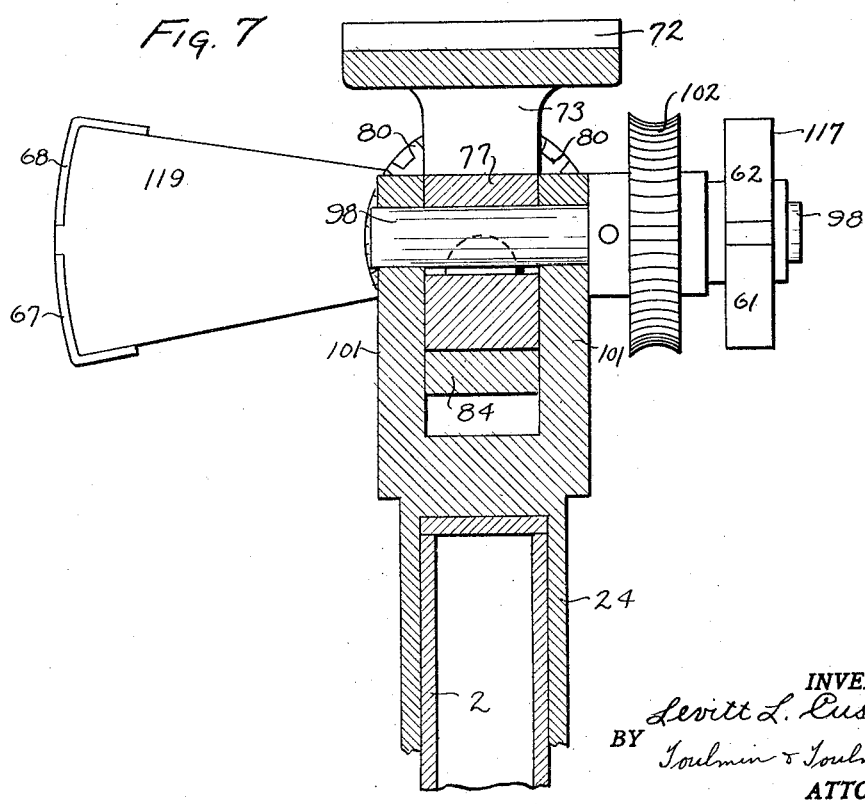
INVENTOR
Levitt L. Custer
BY Toulmin & Toulmin
ATTORNEY

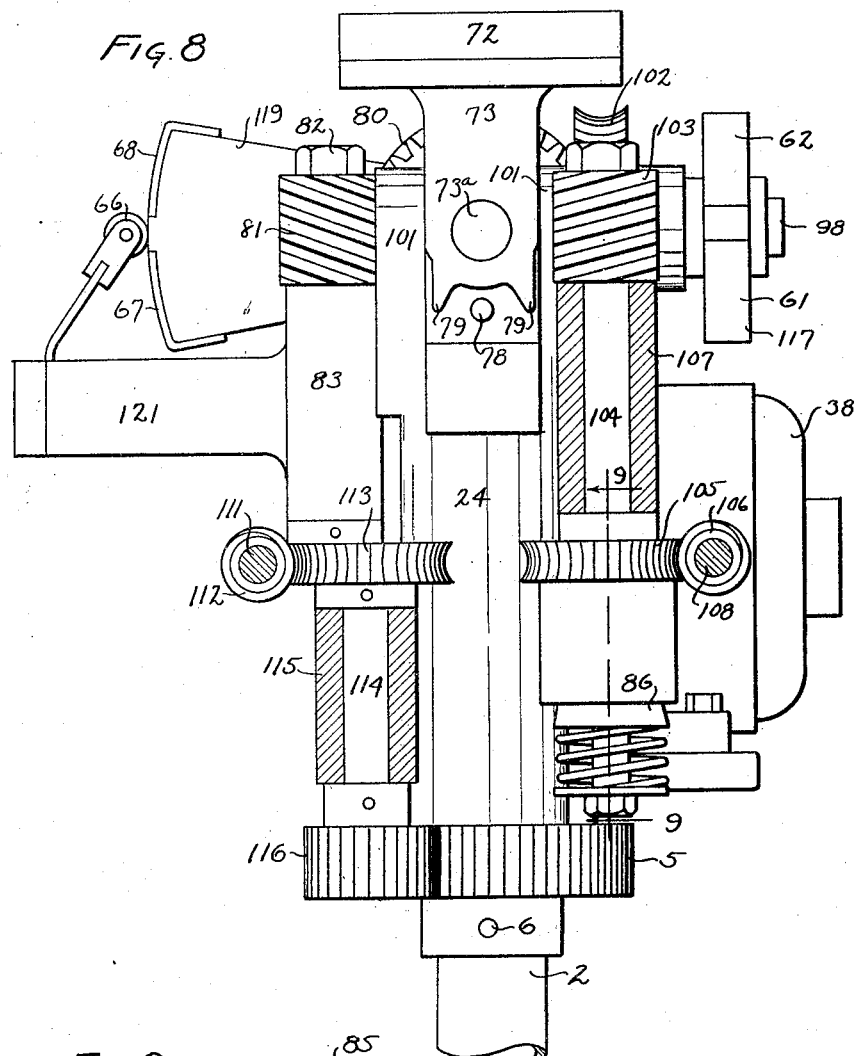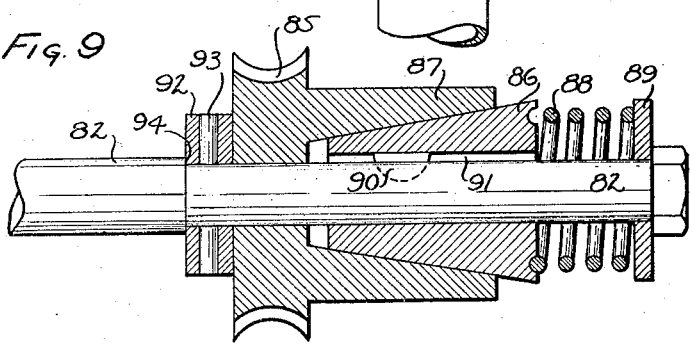

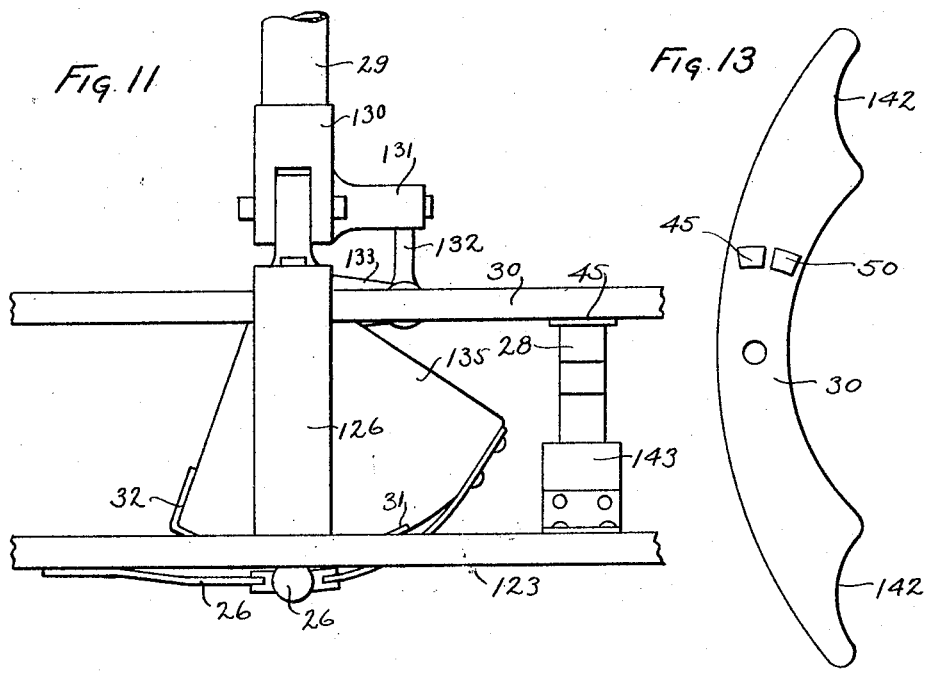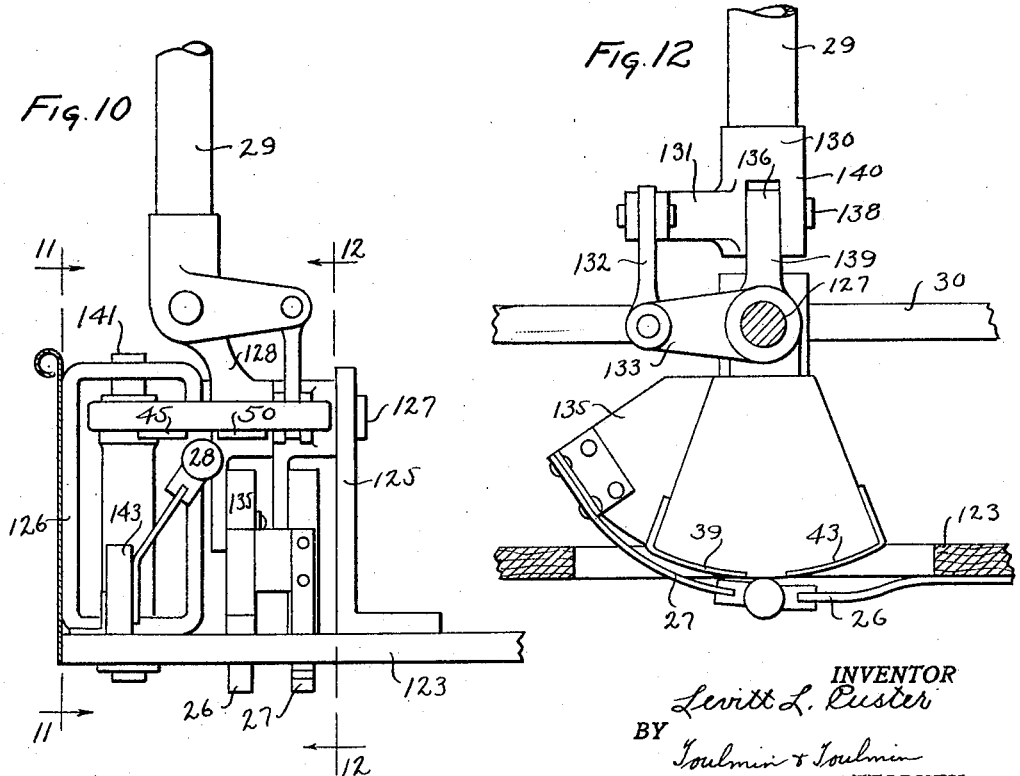

May 16, 1933.  L. L. CUSTER  1,909,573
AMUSEMENT APPARATUS
Filed June 25, 1928   8 Sheets-Sheet 7
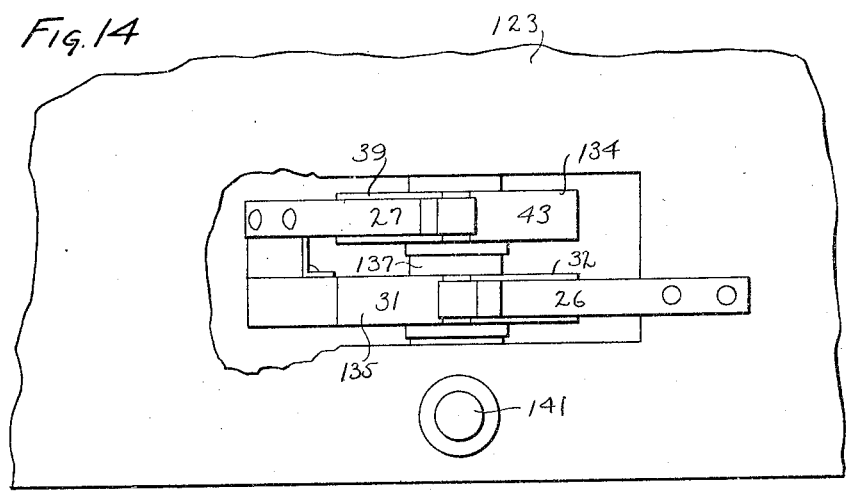
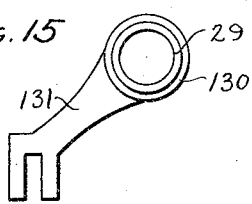
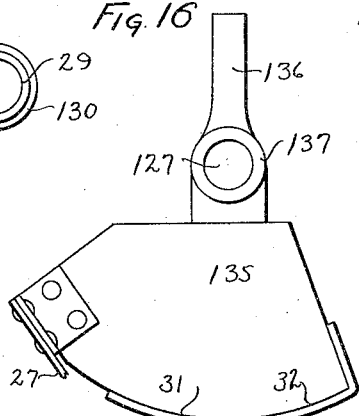
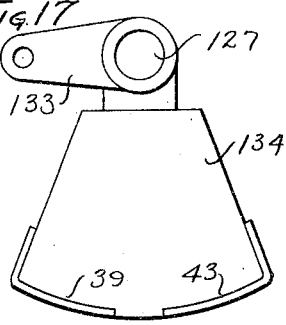
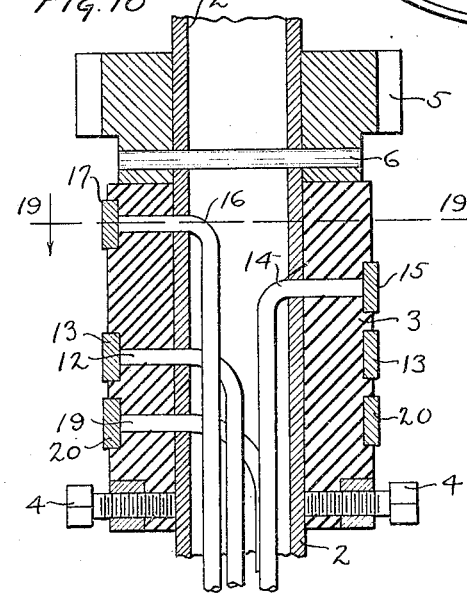
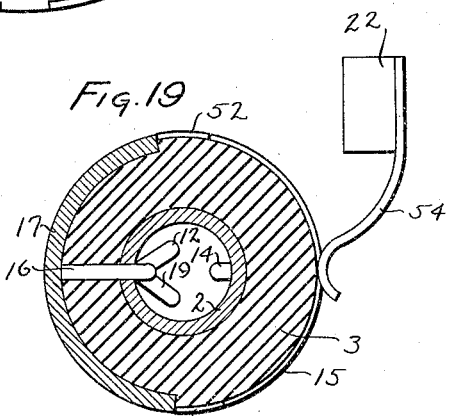
INVENTOR
Levitt L. Custer
BY
Toulmin & Toulmin
ATTORNEY May 16, 1933. L. L. CUSTER 1,909,573
AMUSEMENT APPARATUS
Filed June 25, 1928 8 Sheets-Sheet 8

INVENTOR
Levitt L. Custer
BY
Toulmin & Toulmin
ATTORNEY

Patented May 16, 1933

1,909,573

UNITED STATES PATENT OFFICE

LEVITT LUZERN CUSTER, OF DAYTON, OHIO

AMUSEMENT APPARATUS

Application filed June 25, 1928. Serial No. 288,063.

My invention relates to amusement apparatus.

It is the object of my invention to provide an amusement apparatus in which the balance of the support for the passenger must be maintained by the passenger through manual control, by means of power movement fore and aft, laterally, and in rotation in a horizontal plane. Thus the passenger must maintain his vehicle seat in its proper direction and in a horizontal position.

It is a further object to provide reverse means for bringing the seat to a level position when desired by the outside control, so as to permit the passenger to get on and off in a convenient and safe position.

It is still a further object of my invention to simulate the difficulties of flying and the control of a flying machine for amusement apparatus while at the same time to provide a safe apparatus that will be adaptable to all kinds and types of passengers.

Referring to the drawings,

Figure 1 is a side elevation of the apparatus.

Figure 2 is a front elevation thereof.

Figure 3 is a plan view thereof.

Figure 5 is a section on the line 5—5 of Figure 4.

Figure 6 is a section on the line 6—6 of Figure 5.

Figure 7 is a section on the line 7—7 of Figure 6.

Figure 8 is a section on the line 8—8 of Figure 5.

Figure 9 is a section on the line 9—9 of Figure 8.

Figure 10 is a side elevation of the manual control and tiller apparatus.

Figure 11 is a front elevation thereof, taken on the line 11—11 of Figure 10.

Figure 12 is a section on the line 12—12 of Figure 10.

Figure 13 is a bottom plan view of the tiller plate.

Figure 14 is a bottom plan view of the control segments.

Figure 15 is a detail view of one of the control stick yokes.

Figure 16 is a detail view of one of the control stick segments.

Figure 17 is a detail view of another control segment.

Figure 18 is a section on the line 18—18 of Figure 4.

Figure 19 is a section on the line 19—19 of Figure 18.

Figure 4:
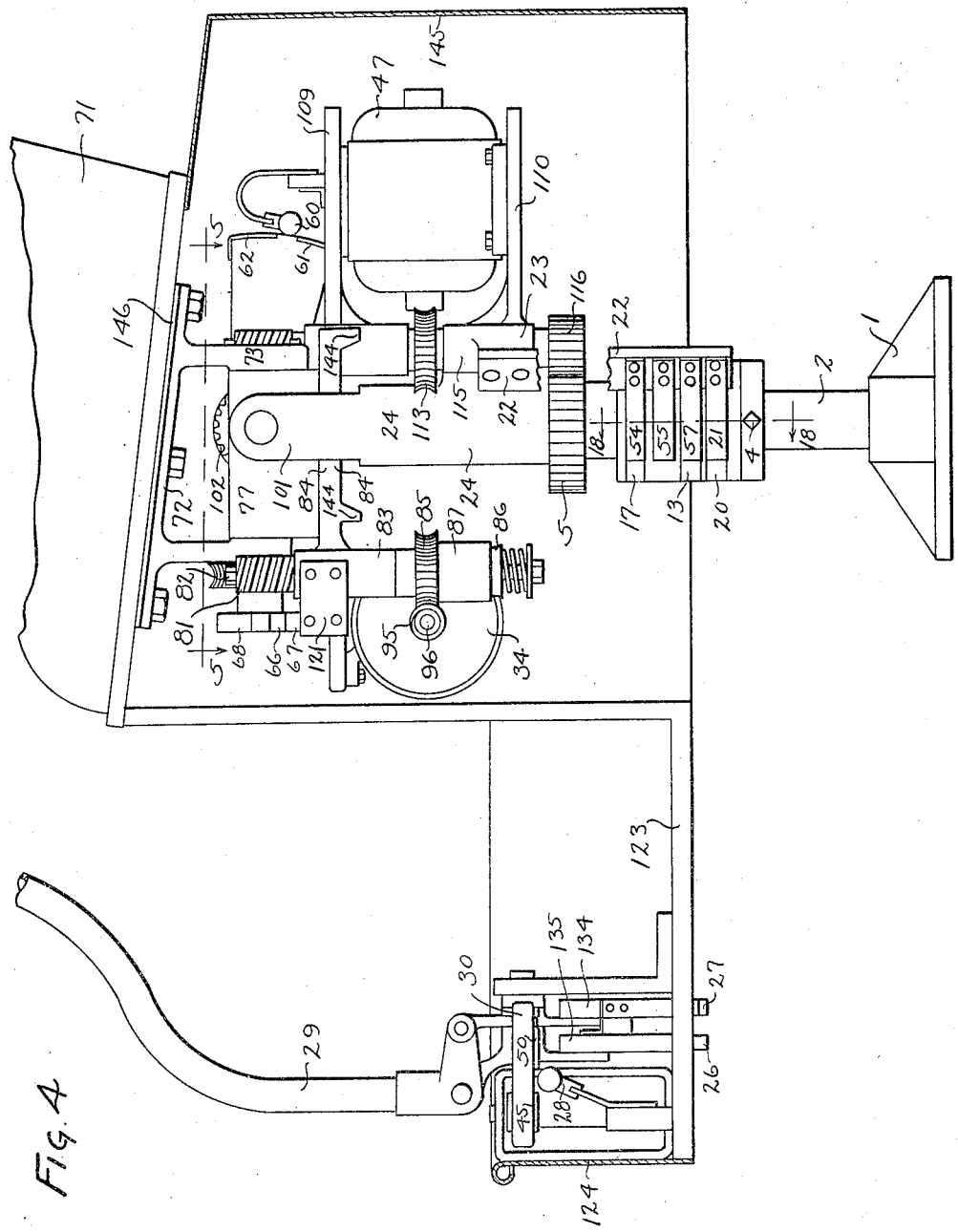
Figure 4 is a section on the line 4—4 of Figure 3.

Referring to the drawings in detail, 1 is a supporting base for the non-rotating standard 2. This standard, as will be seen in Figure 18, is hollow and forms a passageway for a plurality of current distribution wires which lead out through the standard 2, through a sleeve 3 of insulation material, where the wires terminate in a plurality of band contact surfaces, which are suitably engaged by contact members, as will be hereinafter described. This sleeve 3 is attached to the support 2 by the set screws 4. Mounted upon the sleeve and stationarily attached thereto is a gear 5 pinned to the support shaft 2 by the pin 6. See Figs. 4 and 18.

Figure 20:
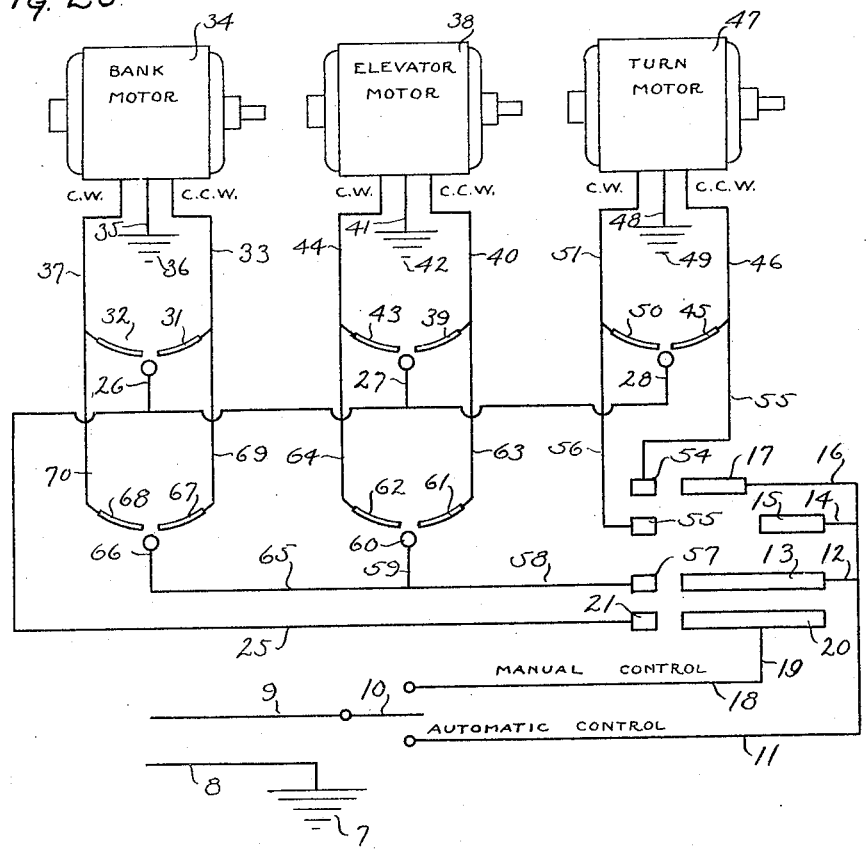
Figure 20 is a diagrammatic view of the contacts, wiring and motor apparatus.

The circuit is preferably a 220 volt circuit, one side of which is grounded at 7 on the side designated 8 Figure 20, while the other side 9 is provided with a two-way switch 10. This switch engages on one side with the automatic control lead 11 that is in turn connected by the wire 12 to the contact full circle ring 13 and by the wire 14 to the less than semi-circular contact ring 15; and by the wire 16 to the less than semi-circular contact ring 17.

The switch 10 is adapted to engage on the other hand with the manual control lead 18 which engages through the wire 19 with the full circle contact bar 20. See Figs. 18 and 20.

Referring further to Figure 20, it will be noted that the manual control, which is that control operated by the operator in the seat, operates as follows. The contact ring 20 engages with a contact finger 21 that moves with the seat, being carried upon the depending arm 22 that is suspended from the seat structure and turns without being fastened to the sleeve 23 on the bracket member 24. This contact member 21 is connected by the wire 25 to the contact member 26 which controls the banking of the seat, that is, its lateral movement on a fore and aft axis; contact member 27 controls the elevator motor which is the motor that regulates the fore and aft movement of the seat on an axis transverse the pivotal axis or the axis the seat may have assumed in its banking operation; and the contact member 28 which controls the turn motor that revolves the seat in either direction.

It will be understood that these motors are reversible, that these contacts control the reversing of the motors as well as the direction of movement of the seat. The position of the contacts 26, 27 and 28 is determined by the operator's hands, and the foot operated tiller plate 30 operated by the operator's feet.

The bank contact 26 is adapted to engage with either of the spaced contact segments 31 or 32. Engagement with the contact segment 31 leads the current through the wire 33 to the bank motor 34 and thence by wire 35 to the ground 36. Contact between the contact 26 and the segment 32 leads the current through the wire 37 to the motor 34 and thence by wire 35 to the ground 36 and the motor turns in a clockwise direction. When the contact 26 is in a neutral position between the segments 31 and 32, the motor is at rest.

Likewise the elevator motor 38 is controlled by the engagement of the contact member 27 with the segment 39, which in turn is attached to the wire 40. This results in moving the elevator motor in a counter-clockwise direction. This motor is grounded by the wire or other suitable means 41 to the ground 42.

On the other hand the contact member 27, when it engages with the segment 43 and which in turn is attached to the wire 44 and the motor 38, results in moving the motor 38 in a clockwise direction.

Turning to the contact member 28, it will be noted that when it engages the segment 45, the current will be conveyed through the wire 46 to the turn motor 47 which is grounded by the wire 48 to the ground 49. This results in the counter-clockwise movement of the motors.

Upon the engagement of the contact member 28 with the segment 50 the current is led through the wire 51 to the motor 47, which turns in a clockwise direction. The contacts 26 and 27 are controlled by the control stick 29. The control stick controls the banking and the elevating.

The tiller plate 30 controls the turn motor 47 which determines the rotation of the seat.

To bring the seat back to its normal, inoperative position, so far as rotation is concerned, I employ the stationary contacts 15 and 17, which are located one below the other in staggered relationship, as each of them are substantially less than a semi-circle. As will be seen in Figure 19 there is a gap 52 and 53 at either end between the segments, so that the contact members 54 and 55 located one above the other may come to rest in an area where neither of them engages their respective contact segments 15 and 17, so that the motor will come to rest and will have returned the chair to its normal, inoperative position.

The contact member 54 is connected by the wire 54a to the counter-clockwise side of the turn motor, while the contact member 55 is connected by the wire 56 to the clockwise side of the motor.

Turning to the reverse circuit for bringing the elevator motor back to neutral, horizontal position of the chair, the movable contact finger 57 is adapted to engage with the full circle 13 which is stationary. 57 in turn is connected to the wire 58 and the wire 59 as attached to the reverse contact member 60. This contact member is attached to engage with the spaced segments 61 and 62 alternately, and when the reverse mechanism has been brought to neutral position, 60 will lie between 61 and 62 without contact with either of them. The contact segment 61 is connected to the counter-clockwise side of the elevator motor 38 by the wire 63. The segment 62 is connected to the clockwise side of the elevator motor 38 by the wire 64.

Turning to the reverse control of the bank motor to bring the chair back through the bank motor's operation to its normal, inoperative position, from a lateral dipping, by reason of banking, I provide a wire 65 that is connected to the wire 58. The free end of the wire 65 has a contact member 66 which is normally located between the spaced segments 67 and 68. The segment 67 is connected by the wire 69 to the bank motor 34 so that when this engagement is made, the bank motor will turn in a counter-clockwise direction. On the other hand, the contact 66 when it engages with the segment 68 is connected to the clockwise side of the bank motor 34 by the wire 70. When the contact member 66 is located between 67 and 68, the motor is at rest and the chair has been brought to its horizontal position with respect to its lateral tipping.

Thus I provide two systems: one of manual control by which the operator's skill is necessary in order to maintain the proper direction and horizontal position of the chair, and a reverse control that is located remote from the chair to be controlled by an outside operator, so that at the end of the amusement period the outside operator can switch the current from the manual control to the reverse control, bringing the chair back to its normal and horizontal position, to permit the passenger to descend and a new passenger to occupy the chair. This is particularly essential in an amusement apparatus where the right to use the chair for a certain period is sold, and it is necessary to return the equipment to a normal position, positively and definitely, at given intervals, which are under the control of the manager of the amusement apparatus.

Turning from the circuit to the specific mechanism, it will be noted that the chair 71 is mounted upon a plate 72, having depending arms 73 which can be seen both in Figure 4 and particularly in section in Figure 6. These arms are mounted on the shafts 73a and 74 which are pinned to the arms by the pins 75 and 76. The shafts are journalled in line with one another in the block 77. The pin 78 carried by the block is adapted to engage with spaced ears 79 on the rear bracket arm 73. This limits the lateral movement of the chair, the arms 73 and the plate 72. The chair, plate and arms are rotated by applying power to the shaft 74 through the worm gear 80 which is mounted thereon.

This worm gear is driven by a worm 81 mounted on the shaft 82 carried in the vertical sleeve 83 of the supporting plate 84. The lower end of this shaft 82 is provided with a second worm gear 85 that is clutched to the shaft by the tapered clutch member 86, which is forced into engagement, as will be seen in Figure 9, to the interior of the worm gear sleeve 87 by the spring 88, the free end of which abuts against the washer 89 of the shaft 82.

A key 90 works in a keyway 91 on the interior of the tapered clutch plug 86 to guide it inwardly and outwardly on the shaft 82 and to cause it to turn with the shaft 82. A ring 92 is pinned by the pin 93 to the shaft 82 and is located between the shoulder 94 on the shaft 82 and the gear 95, to provide a broad friction surface on the side of the gear opposite the clutch sleeve 87. This gear 95 is engaged by a worm gear which is carried on the armature shaft 96 of the bank motor 34. This bank motor 34 is suspended from the underside of the supporting plate 84.

This plate 84 also carries the block 77 which is attached thereto by the set screws 97. The block 77 and the plate 84 turn together with the transverse shaft 98 which passes through the aperture 99 in the block between the ends of the shafts 73a and 74. A key 100 attaches this shaft 98 to the block 77. The free ends of this shaft are supported in the upstanding spaced ears 101 on the upper end of the bracket supporting member which is swivelly mounted upon the upper end of the hollow standard 2, by means of the inverted hollow cylindrical structure, generally designated as the sleeve member 24 that is adapted to rotate upon the hollow standard 2. This rotation is effected by the turn motor 47 and its associated mechanism which will be hereinafter described.

Before describing the turn motor, however, I will now describe the elevator mechanism which operates the shaft 98 to throw the seat fore and aft for elevating purposes. The shaft 98 carries the worm gear 102. The worm gear 102 is in turn driven by worm 103 on the shaft 104, the lower end of which has mounted thereon the worm gear 105 which meshes with the worm 106. This shaft 104 is carried in the sleeve 107 which is a part of the sleeve supporting member 24. The worm 106 is mounted on the armature shaft 108 of the elevator motor 38 that is suspended from the underside of the plate bracket support 109 which is formed as a part of the rotatable swinging sleeve support 24. The lower end of the shaft 104 is provided with a clutch mechanism similar to that mounted on the shaft 82 and like numbers indicating similar mechanism.

Turning to the turn mechanism shown in side elevation in Figure 4 and in plan in Figure 5, it will be noted that the motor 47 is mounted upon a motor supporting plate or bracket 110 which is a part of the sleeve supporting member 24. This armature shaft 111 of this motor drives a worm 112 that engages with a worm wheel 113 on the vertically disposed shaft 114 that is mounted in the sleeve 115 which is a part of the sleeve 24. The lower end of this shaft 114 is provided with a gear 116 that engages with the gear 5, that is stationary as it is pinned to the supporting standard 2.

With respect to the automatic mechanism for revolving the elevating mechanism to neutral, horizontal position, I provide an insulated segment 117 which is carried on an arm 118 on the shaft 98. It carries the contacts 61 and 62 while the supporting platform 109 carries the contact member 60.

With respect to the automatic mechanism for restoring the banking mechanism to neutral, horizontal position, I provide a segment 119 which in turn is carried by the arm 120 on the elevator shaft 74. The end of this segment carries the contacts 67 and 68 while the contact member 66 is carried on the bracket 121. This bracket 121 is mounted on the sleeve 83.

The seat 71 has depending from it a heel board 122, a floor board 123, and semi-circular dash board 124. On this floor board 123 there are mounted a pair of spaced brackets 125 and 126 which serve to support the shaft 127 on which is pivotally mounted the bracket 128 to control stick 29. This control stick is provided with a sleeve 130 having a laterally extending and forwardly projecting arm 131, from which depends a link 132 which, at its free end, is pivotally connected to a bell crank 133. This bell crank carries on its other free depending arm the elevator segment 134 which carries the contacts 39 and 43. This segment is free to rotate on the shaft 127.

Another segment 135 known as the bank segment carrying the contacts 31 and 32 is provided with an upstanding pin or finger 136 which has an eye 137 for receiving the shaft 127 on which it is pivotally mounted.

As the stick 29 is pivoted at 138 on the stub shaft support 139, that is fitted into the bracket 128, it can rock laterally and when it does so the jaw 140 of the sleeve 130 engages the upstanding pin 136, causing the segment 135 to rock laterally.

As this segment carries the contact member 27 engaging alternately with the contacts 39 and 43 on the segment 134 of the elevator, the fore and aft movement of the control stick 29 will move the elevator 43, so that when the stick is pushed forward the chair will tilt forwardly, and when pulled backward it will tilt backwardly.

The lateral movement of the stick 29 will move laterally the bank segment 135 with respect to its stationary contact 26, carried on the underside of the floor board 123, thereby alternately engaging the contacts 31 and 32 so that when the stick is moved to the right hand the chair will turn to the right, and when pulled to the left hand the chair will tilt to the left, but such movement does not disturb the relative position of the segment 134, its contacts and the contact member 127, which is carried on the segment 135, as these two segments travel together as a body when the stick 29 is moved laterally.

The elevator rudder plate 30 is pivotally mounted on the upstanding standard 141 mounted on the floor board 123. The feet of the operator engage the respective arcuate ends 142 of the rudder plate. The contact member 28 is stationarily mounted upon the standard 143 on the floor board 123, so that it will alternately engage with the contacts 45 and 50 on the underside of the rudder plate.

The lugs 144 serve as stop lugs which engage with the bracket 24 to limit the fore and aft movement of the chair. The clutches provide means for the motor to continue to turn even if the chair is stopped in its position so that the gears will not be stripped or the motor burnt out. 145 indicates an enclosing skirt or apron for enclosing the mechanism to prevent persons from getting entangled in the mechanism. 146 indicates a plate of insulating material to insulate the chair from the remainder of the mechanism.

Figure 21:
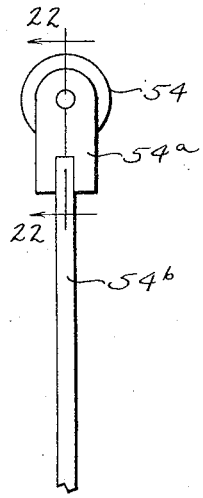
Figure 21 is a detail side elevation of a contact arm and roller.
Figure 22:
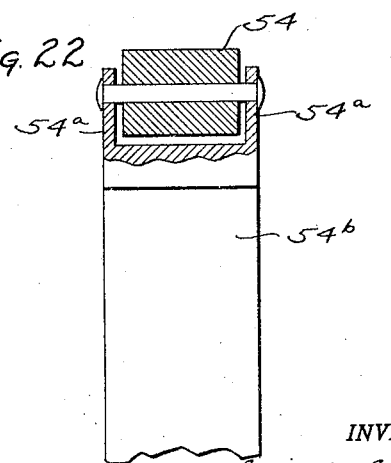
Figure 22 is a section on the line 22—22 of Figure 21.

Referring to Figures 21 and 22, a typical contact member such as 54 consists of a roller, supported in a box 54a on a flexible strip 54b for maintaining the contact roller in yielding position.

Method of operation

It will be understood that my invention comprehends the use of a swivelly and pivotally mounted chair in which the operator sits, the position of which the operator endeavors to control by a hand lever 29 controlling the fore and aft tilting and the lateral tilting of the chair, and a foot control guiding mechanism which controls the position in which the chair faces, and the rotation of the chair for so positioning it. As the motors are continuously turning in one direction or the other, except as the contacts happen to pass over the neutral points, and as the seat of the operator in the chair plus the weight of the chair itself and its mechanism will tend to tilt the chair in one direction or the other, it will require considerable skill to maintain the chair in neutral position where it is horizontal. That is the objective of the person sitting in the chair and being amused.

By pushing the lever 29 forward the chair is dipped forwardly. By pulling the lever towards the occupant of the chair the chair tilts backwardly. By moving the lever to the right hand the chair will tilt to the right and by moving the lever to the left hand the chair will tilt to the left. By pushing on the tiller plate 30 with the right foot the chair will revolve in a clockwise direction, and by pushing on the left hand it will revolve in a counter-clockwise direction.

It will be understood that the contacts 13, 15, 17 and 20 are stationary and that all the other contacts move with the chair.

It will be understood that I desire to comprehend within my invention, all the modifications and changes necessary to adapt it to varying conditions and uses.

Having thus fully described my invention, what I claim as new, and desire to secure by Letters Patent is:

1. In an amusement apparatus, a seat for the operator, a stationary standard carrying a current supply contact in a stationary position, a movable contact carried by the seat mechanism and turning therewith in engagement with the stationary contact, a turn motor for turning the seat in opposite directions, an elevator motor for tilting the seat fore and aft in opposite directions, a bank motor for tilting the seat laterally in opposite directions, said motors being connected to the respective movable contacts, reversing switches for said motors, and means controlled by the operator for controlling said reversing switches to determine the direction of the movement of the motors, whereby the seat may be maintained by the operator facing in a given direction and in a neutral horizontal position.

2. In an amusement apparatus, a seat for the operator, a stationary standard carrying a current supply contact in a stationary position, a movable contact carried by the seat mechanism and turning therewith in engagement with the stationary contact, a turn motor for turning the seat in opposite directions, an elevator motor for tilting the seat fore and aft in opposite directions, a bank motor for tilting the seat laterally in opposite directions, said motors being connected to the respective movable contacts, reversing switches for said motors and means controlled by the operator for controlling said reversing switches to determine the direction of the movement of the motors, whereby the seat may be maintained by the operator facing in a given direction and in a neutral horizontal position, and means to limit the lateral and fore and aft tilting of the seat.

3. In an amusement apparatus, a stationary standard, a seat revolvably mounted thereon, a rotating supporting means, means on the rotating supporting means permitting of lateral and fore and aft tilting of the seat, a current supply stationarily located, a movable current take-off moving with the seat for supplying a plurality of motors, a turn motor carried on said rotating supporting means, an elevator and a bank motor carried thereon, and a plurality of reversing switches, operable from said seat for reversing the direction of said motors.

4. In an amusement apparatus, a stationary standard, a seat revolvably mounted thereon, a rotating supporting means, means on the rotating supporting means permitting of lateral and fore and aft tilting of the seat, a current supply stationarily located, a movable current take-off moving with the seat for supplying a plurality of motors, a turn motor carried on said rotating supporting means, an elevator and a bank motor carried thereon, a plurality of reversing switches, operable from said seat for reversing the direction of said motors, a hand control for operating said switches, reversing the direction of the elevator and bank motors, and a foot control for reversing the direction of the turn motor.

5. In an amusement apparatus, a stationary standard, a seat revolvably mounted thereon, a rotating supporting means, means on the rotating supporting means permitting of lateral and fore and aft tilting of the seat, a current supply stationarily located, a movable current take-off moving with the seat for supplying a plurality of motors, a turn motor carried on said rotating supporting means, an elevator and a bank motor carried thereon, a plurality of reversing switches, operable from said seat for reversing the direction of said motors, a hand control for operating said switches, reversing the direction of the elevator and bank motors, and a foot control for reversing the direction of the turn motor, said reversing switches of the elevator and bank motors being so arranged that they move together whereby they maintain their respective, relative positions, so that either of them may be adjusted irrespective of the lateral or fore and aft position of the hand control.

6. In an amusement apparatus a stationary supporting standard, a seat bracket revolvable thereon, a seat mounted thereon adapted to tilt laterally and fore and aft on the bracket, motors for moving said seat rotatably on the standard and for tilting the seat laterally and fore and aft on the bracket, a stationary source of current supply, a movable contact for said current supply connected to the motors, carried with the seat, a plurality of reversing switches for said motors, two of said switches being manually controlled, one of said switches consisting of a pair of spaced contact members movable with the manual control and a stationary contact member carried by the seat, a second pair of contact members movable by the manual control and a second alternate contact member therefor, adapted to move with the first pair of contact members whereby the lateral movement of the first pair of contact members will reverse the motor to which they are connected and the fore and aft movement of the manual means will reverse the motor to which the second pair of contacts are connected.

7. In an amusement apparatus, a stationary standard, a revolving chair support mounted thereon, means for rotating said chair support and the chair, means for mounting the chair to tilt laterally and fore and aft on the support, means for moving said chair laterally and fore and aft in opposite tilting positions, a floor board suspended from the seat, a manual control stick pivotally mounted thereon for fore and aft and lateral movement, a pair of segmental contact supporting members connected thereto, so arranged that one of them will be moved laterally with respect to the other upon the fore and aft movement of the control stick, and both of them will move together upon the lateral movement of the control stick, pairs of contacts mounted on said members, a stationary contact adapted to engage with the pairs of contacts alternately that are moved by the lateral movement of the control stick, and a movable contact member adapted to engage with a pair of contacts that are moved by the fore and aft movement of the control stick.

8. In an amusement apparatus, a stationary standard, a revolving chair support mounted thereon, means for rotating said chair support and the chair, means for mounting the chair to tilt laterally and fore and aft on the support, means for moving said chair laterally and fore and aft in opposite tilting positions, a floor board suspended from the seat, a manual control stick pivotally mounted thereon for fore and and aft and lateral movement, a pair of segmental contact supporting members connected thereto, so arranged that one of them will be moved laterally with respect to the other upon the fore and aft movement of the control stick, and both of them will move together upon the lateral movement of the control stick, pairs of contacts mounted on said members, a stationary contact adapted to engage with the pairs of contacts alternately that are moved by the lateral movement of the control stick, and a movable contact member adapted to engage with a pair of contacts that are moved by the fore and aft movement of the control stick, said movable contact member being adapted to move with the first mentioned pairs of contacts that engage with the stationary contact.

9. In an amusement apparatus, a stationary standard, a revolving chair support mounted thereon, means for rotating said chair support and the chair, means for mounting the chair to tilt laterally and fore and aft on the support, means for moving said chair laterally and fore and aft in opposite tilting positions, a floor board suspended from the seat, a manual control stick pivotally mounted thereon for fore and aft and lateral movement, a pair of segmental contact supporting members connected thereto, so arranged that one of them will be moved laterally with respect to the other upon the fore and aft movement of the control stick and both of them will move together upon the lateral movement of the control stick, pairs of contacts mounted on said members, a stationary contact adapted to engage with the pairs of contacts alternately that are moved by the lateral movement of the control stick, and a movable contact member adapted to engage with a pair of contacts that are moved by the fore and aft movement of the control stick, said movable contact member being adapted to move with the first mentioned pairs of contacts that engage with the stationary contact, and contact means for controlling the turning of the chair consisting of a foot throttle pivotally mounted on the floor board, reversing contacts thereon, and a stationary contact for alternately engaging therewith carried on the floor board.

10. In an amusement apparatus, a supporting standard having a stationary gear thereon, a ring contact for supplying current, a revolvable bracket mounted on the standard, a movable contact member suspended therefrom engaging the stationary contact for supplying current to a plurality of motors, a turn motor supported on said bracket, a pinion engaging the stationary gear driven thereby, a tilting platform adapted to tilt fore and aft on said bracket, an elevator motor suspended therefrom, means driven by said motor for tilting said tilting plate fore and aft on the rotatable bracket, means for pivotally mounting a chair for lateral tilting on the tilting plate, a motor mounted on the tilting plate, means connected thereto for tilting said chair laterally from side to side on the tilting plate, and revolvable switches connected to said motors controlled by the occupant of the seat.

11. In an amusement apparatus, a supporting standard having a stationary gear thereon, a ring contact for supplying current, a revolvable bracket mounted on the standard, a movable contact member suspended therefrom engaging the stationary contact for supplying current to a plurality of motors, a turn motor supported on said bracket, a pinion engaging the stationary gear driven thereby, a tilting platform adapted to tilt fore and aft on said bracket, an elevator motor suspended therefrom, means driven by said motor for tilting said tilting plate fore and aft on the rotatable bracket, means for pivotally mounting a chair for lateral tilting on the tilting plate, a motor mounted on the tilting plate, means connected thereto for tilting said chair laterally from side to side on the tilting plate, revolvable switches connected to said motors controlled by the occupant of the seat, said control means consisting of a stick control for the fore and aft and lateral tilting, and a foot control for the rotating of the chair.

12. In an amusement apparatus, a supporting standard having a stationary gear thereon, a ring contact for supplying current, a revolvable bracket mounted on the standard, a movable contact member suspended therefrom, engaging the stationary contact for supplying current to a plurality of motors, a turn motor supported on said bracket, a pinion engaging the stationary gear driven thereby, a tilting platform adapted to tilt fore and aft on said bracket, an elevator motor suspended therefrom, means driven by said motor for tilting said tilting plate fore and aft on the rotatable bracket, means for pivotally mounting a chair for lateral tilting on the tilting plate, a motor mounted on the tilting plate, means connected thereto for tilting said chair laterally from side to side on the tilting plate, revolvable switches connected to said motors controlled by the occupant of the seat, said control means consisting of a stick control for the fore and aft and lateral tilting, and a foot control for the rotating of the chair, said stick control switches being so arranged that the fore and aft movement of the stick will control the fore and aft tilting of the chair, and the lateral movement of the stick will control the lateral tilting of the chair.

13. In an amusement apparatus, a supporting standard having a stationary gear thereon, a ring contact for supplying current, a revolvable bracket mounted on the standard, a movable contact member suspended therefrom, engaging the stationary contact for supplying current to a plurality of motors, a turn motor supported on said bracket, a pinion engaging the stationary gear driven thereby, a tilting plate adapted to tilt fore and aft on said bracket, an elevator motor suspended therefrom, means driven by said motor for tilting said tilting plate fore and aft on the rotatable bracket, means for pivotally mounting a chair for lateral tilting on the tilting plate, a motor mounted on the tilting plate, means connected thereto for tilting said chair laterally from side to side on the tilting plate, revolvable switches connected to said motors controlled by the occupant of the seat, said control means consisting of a stick control for the fore and aft and lateral tilting, a foot control for the rotating of the chair, said stick control switches being so arranged that the fore and aft movement of the stick will control the fore and aft tilting of the chair, and the lateral movement of the stick will control the lateral tilting of the chair, means on said tilting plate for limiting the fore and aft movement thereof, and means associated with the chair for limiting the lateral tilting of the chair with respect to the tilting plate.

14. In an amusement apparatus, an elevator and banking control comprising a floor board support, a control stick pivoted for lateral and fore and aft movement, a bank segment adapted to be moved laterally, upon the lateral movement of the control stick, spaced contacts on the bank segment, a stationary contact member adapted to engage therewith carried by the floor board, an elevator segment adapted to move laterally with the bank segment, while the stick is being moved laterally, and adapted to be moved laterally relatively of the bank segment, when the control stick is moved fore and aft, a pair of spaced contacts on the elevating segment and a contact member alternately engaging therewith carried by the bank segment.

In testimony whereof, I affix my signature.

LEVITT LUZERN CUSTER.